(12) United States Patent
Wigen et al.

(10) Patent No.: US 9,488,534 B2
(45) Date of Patent: Nov. 8, 2016

(54) SUPERCRITICAL TOTAL AIR TEMPERATURE SENSORS

(71) Applicant: Rosemount Aerospace Inc., Burnsville, MN (US)

(72) Inventors: Scott Wigen, Lakeville, MN (US); Matthew J. T. Gmach, Eagan, MN (US); Robert E. Sable, Lakeville, MN (US); John T. Otto, Shakopee, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 376 days.

(21) Appl. No.: 14/189,885

(22) Filed: Feb. 25, 2014

(65) Prior Publication Data

US 2015/0063414 A1 Mar. 5, 2015

Related U.S. Application Data

(60) Provisional application No. 61/874,223, filed on Sep. 5, 2013.

(51) Int. Cl.
*G01K 1/12* (2006.01)
*G01K 1/14* (2006.01)
*G01K 13/02* (2006.01)

(52) U.S. Cl.
CPC .................. *G01K 13/028* (2013.01)

(58) Field of Classification Search
CPC ............ G01K 1/08; G01K 7/00; G01K 1/14; G01K 7/02; G01K 13/02; G01K 1/12; G01K 1/16; G01K 17/00; G01K 1/20; G01K 2013/026; G01K 11/06
USPC ............... 374/100, 141, 138, 163, 179, 208; 340/580, 581; 702/130, 132; 73/170.1
See application file for complete search history.

(56) References Cited

U.S. PATENT DOCUMENTS

| 3,512,414 A | * | 5/1970 | Rees ...................... G01K 13/02 244/134 R |
|---|---|---|---|
| 4,244,222 A | | 1/1981 | Hoyer et al. |
| 4,595,298 A | | 6/1986 | Frederick |
| 2013/0163636 A1 | * | 6/2013 | Parsons ................ G01K 13/028 374/158 |

* cited by examiner

*Primary Examiner* — Gail Kaplan Verbitsky
(74) *Attorney, Agent, or Firm* — Locke Lord LLP; Joshua L. Jones

(57) ABSTRACT

A total air temperature sensor includes a supercritical airfoil body extending from an airfoil base to an opposed airfoil tip along a longitudinal axis. The supercritical airfoil body defines an interior flow passage with an inlet for fluid communication of fluid into the interior flow passage and an outlet for exhausting fluid out from the interior flow passage. A temperature probe is mounted within the interior flow passage for measuring temperature of flow through the interior flow passage to determine total air temperature.

15 Claims, 3 Drawing Sheets

SUPERCRITICAL TOTAL AIR TEMPERATURE SENSORS

CROSS-REFERENCE TO RELATED APPLICATIONS

This application claims priority to U.S. Provisional Patent Application No. 61/874,223 filed Sep. 5, 2013, which is incorporated by reference herein in its entirety.

BACKGROUND OF THE INVENTION

1. Field of the Invention

The present disclosure relates to temperature sensors, and more particularly to total air temperature sensors, such as used in aerospace applications.

2. Description of Related Art

Modern jet powered aircraft require very accurate measurement of outside air temperature for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or (Ts), (2) total air temperature (TAT) or (Tt), (3) recovery temperature (Tr), and (4) measured temperature (Tm). Static air temperature (SAT) or (Ts) is the temperature of the undisturbed air through which the aircraft is about to fly. Total air temperature (TAT) or (Tt) is the maximum air temperature that can be attained by 100% conversion of the kinetic energy of the flow. The measurement of TAT is derived from the recovery temperature (Tr), which is the adiabatic value of local air temperature on each portion of the aircraft surface due to incomplete recovery of the kinetic energy. Recovery temperature (Tr) is obtained from the measured temperature (Tm), which is the actual temperature as measured, and which can differ from recovery temperature because of heat transfer effects due to imposed environments.

Total air temperature sensors used at the inlets of gas turbine engines, for example, can use airfoil shaped members with slots positioned so the gas stream to be sensed passes through one of the slots, and the temperature sensor element is mounted in the slot. Examples of such systems are disclosed in U.S. Pat. No. 3,512,414 which is incorporated by reference herein in its entirety. Such sensor designs can mitigate the effects of high velocity foreign objects being ingested by the engine, and can include provisions for deicing.

One ongoing challenge for total air temperature measurements is associated with operation at higher Mach numbers. Compressibility effects occurring at higher Mach numbers can alter the desired flow pattern through traditional sensors, with potential reduction in response time, for example if there is reduced flow bathing the actual sensor element.

Such conventional methods and systems have generally been considered satisfactory for their intended purpose. However, there is still a need in the art for systems and methods that allow for improved total air temperature sensor performance, including improved time response and recovery error at elevated Mach numbers. There also remains a need in the art for such systems and methods that are easy to make and use. The present disclosure provides a solution for these problems.

SUMMARY OF THE INVENTION

A total air temperature sensor includes a supercritical airfoil body extending from an airfoil base to an opposed airfoil tip along a longitudinal axis. The supercritical airfoil body defines an interior flow passage with an inlet for fluid communication of fluid into the interior flow passage and an outlet for exhausting fluid out from the interior flow passage. A temperature probe is mounted within the interior flow passage for measuring temperature of flow through the interior flow passage to determine total air temperature. The airfoil base can include a mounting flange for mounting the supercritical airfoil body to a support structure. It is contemplated that the supercritical airfoil body can define a high pressure surface and an opposed low pressure surface each extending longitudinally from the airfoil base to the airfoil tip, wherein each of the high and low pressure surfaces extends downstream from a leading edge to a trailing edge of the supercritical airfoil body.

The inlet of the interior flow passage can be defined in the high pressure surface, and the outlet of the interior flow passage can be defined in the low pressure surface. The inlet and outlet of the interior flow passage can each define an elongate aperture extending axially along a respective exterior longitudinal surface of the supercritical airfoil body. It is also contemplated that the inlet of the interior flow passage can be defined axially in the airfoil tip, and the outlet of the interior flow passage can define a pair of elongate apertures each extending axially along a respective one of two opposing exterior longitudinal surfaces of the supercritical airfoil body, for example.

In certain embodiments, the supercritical airfoil body defines a supercritical airfoil with a characteristic normal shock location downstream of the inlet and outlet of the interior flow passage. The supercritical airfoil can extend from a leading edge to a trailing edge that extends downstream of the characteristic normal shock location. It is also contemplated that the supercritical airfoil can extend from a leading edge to a truncated trailing edge that terminates upstream of the characteristic normal shock location.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
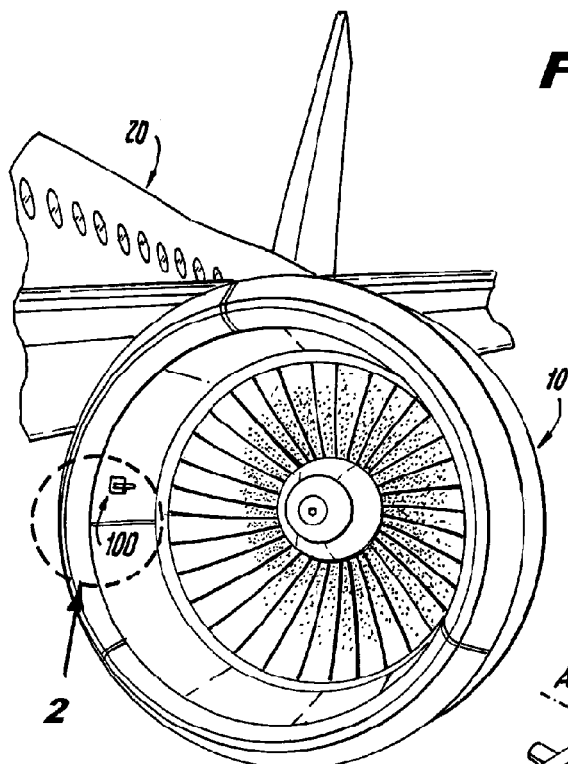
FIG. 1 is a perspective view of an exemplary embodiment of a total air temperature sensor constructed in accordance with the present disclosure, showing the sensor mounted to the inlet of a gas turbine engine.

Reference will now be made to the drawings wherein like reference numerals identify similar structural features or aspects of the subject disclosure. For purposes of explanation and illustration, and not limitation, a partial view of an exemplary embodiment of a total air temperature sensor in accordance with the disclosure is shown in FIG. 1 and is designated generally by reference character 100. Other embodiments of total air temperature probes or sensors in accordance with the disclosure, or aspects thereof, are provided in FIGS. 2-8, as will be described. The systems and methods described herein can be used to improve total air temperature sensor performance, for example at high Mach numbers.

As shown in FIG. 1, total air temperature sensor 100 can be mounted in the inlet of a gas turbine engine 10 on an aircraft 20, for example. Those skilled in the art will readily appreciate that this application is exemplary only, and that sensors in accordance with this disclosure can be used in any other suitable position on an aircraft or in any other suitable application without departing from the scope of this disclosure.

Figure 2:
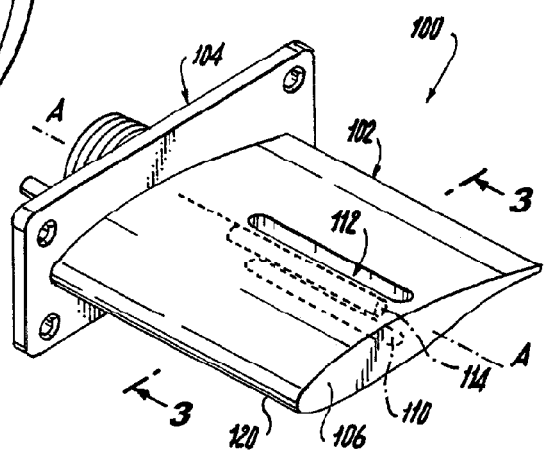
FIG. 2 is a perspective view of the sensor of FIG. 1, showing the supercritical airfoil with inlet and outlet apertures of the interior flow passage defined in the high and low pressure surfaces, respectively.
Figure 3:
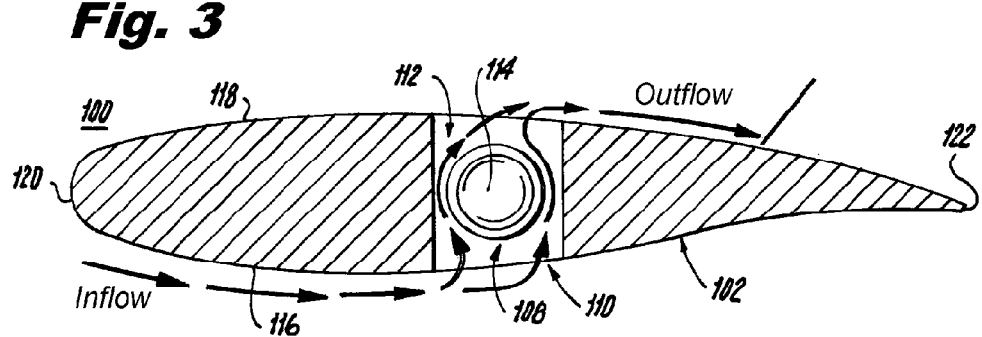
FIG. 3 is a cross-sectional end elevation view of the sensor of FIG. 1, schematically showing flow into and out of the interior flow passage for total air temperature measurements.

With reference now to FIG. 2, sensor 100 includes a supercritical airfoil body 102 extending from an airfoil base 104 to an opposed airfoil tip 106 along a longitudinal axis A. Airfoil base 104 includes a mounting flange for mounting airfoil body 102 to a support structure such as the engine inlet depicted in FIG. 1. As shown in FIG. 3, airfoil body 102 defines an interior flow passage 108 with an inlet 110 for fluid communication of fluid into interior flow passage 108 and an outlet 112 for exhausting fluid out from interior flow passage 108. A temperature probe 114 is mounted within interior flow passage 108 for measuring temperature of flow through interior flow passage 108 to determine total air temperature in the flow outside sensor 100. Compressive effects on flow though interior flow passage 108 make it possible for temperature measurements by temperature probe 114 to be indicative of total air temperature of the airflow external to sensor 100.

With continued reference to FIG. 3, supercritical airfoil body 102 defines a high pressure surface 116 and an opposed low pressure surface 118 each extending longitudinally from airfoil base 104 to airfoil tip 106, which are shown in FIG. 2. Each of the high and low pressure surfaces 116 and 118 extends downstream from a leading edge 120 to a trailing edge 122 of airfoil body 102. Inlet 110 is defined in high pressure surface 116, and outlet 112 is defined in low pressure surface 118, to provide driving potential for the flow through interior passage 108.

As shown in FIG. 2, inlet 110 and outlet 112 each define an elongate aperture extending axially along a respective exterior longitudinal surface of airfoil body 102, i.e., high pressure surface 116 and low pressure surface 118, respectively. Since airfoil body 102 forms a supercritical airfoil, it delays formation of a shock, meaning it defines a characteristic normal shock location proximate trailing edge 122, as indicated schematically by the shock lines in FIG. 3. Since this characteristic normal shock location is downstream of inlet 110 and outlet 112 flow through interior flow passage 108 is not disrupted by external flows at Mach numbers high enough to form a normal shock. This structure allows sensor 100 to have greater flow bathing temperature probe 114 than in traditional configurations where a shock is formed. Therefore, the time response and recovery error of sensor 100 remains substantially unaffected by the formation of a normal shock as the external flow approaches higher Mach numbers, e.g., compared to traditional sensors.

Figure 4:
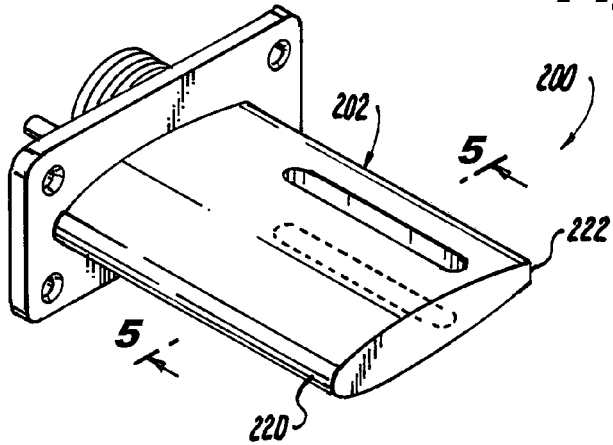
FIG. 4 is a perspective view of another exemplary embodiment of a total air temperature sensor constructed in accordance with the present disclosure, showing a truncated trailing edge that terminates upstream of the characteristic normal shock location.
Figure 5:
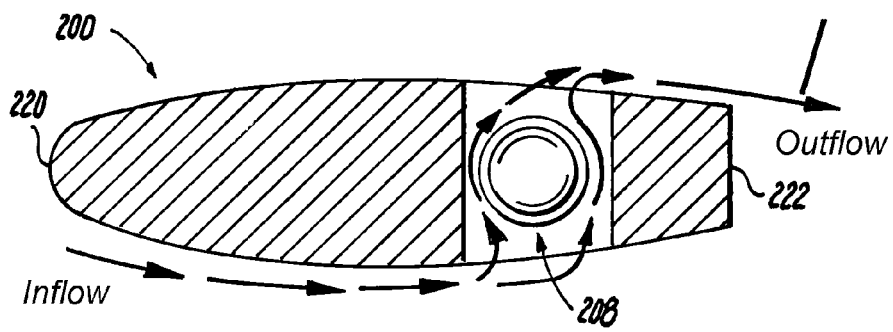
FIG. 5 is a cross-sectional end elevation view of the sensor of FIG. 4, schematically showing flow into and out of the interior flow passage for total air temperature measurements.

In FIG. 3, the supercritical airfoil extends from leading edge 120 to a trailing edge 122 that extends downstream of the characteristic normal shock location. With reference now to FIG. 4, total air temperature sensor 200 is similar to sensor 100 described above, however the supercritical airfoil of airfoil body 202 extends from a leading edge 220 to a truncated trailing edge 222. As shown in FIG. 5, trailing edge 222 terminates upstream of the characteristic normal shock location, which is indicated schematically by the shock line in FIG. 5, to provide improved time response and recovery error even at high Mach numbers, as described above for sensor 100. Aside from trailing edge 222 being truncated upstream of the normal shock location, the airfoil upstream of sensor 200 is identical to that in sensor 100, and the flow through interior flow passage 208 is similar to that described above for sensor 100, as indicated schematically by the flow arrows in FIG. 5. Those skilled in the art will readily appreciate that truncated trailing edge 222 of sensor 200 allows for a wider element passage for a given chord length and causes airfoil body 202 to be lower in weight than airfoil body 102.

Figure 6:
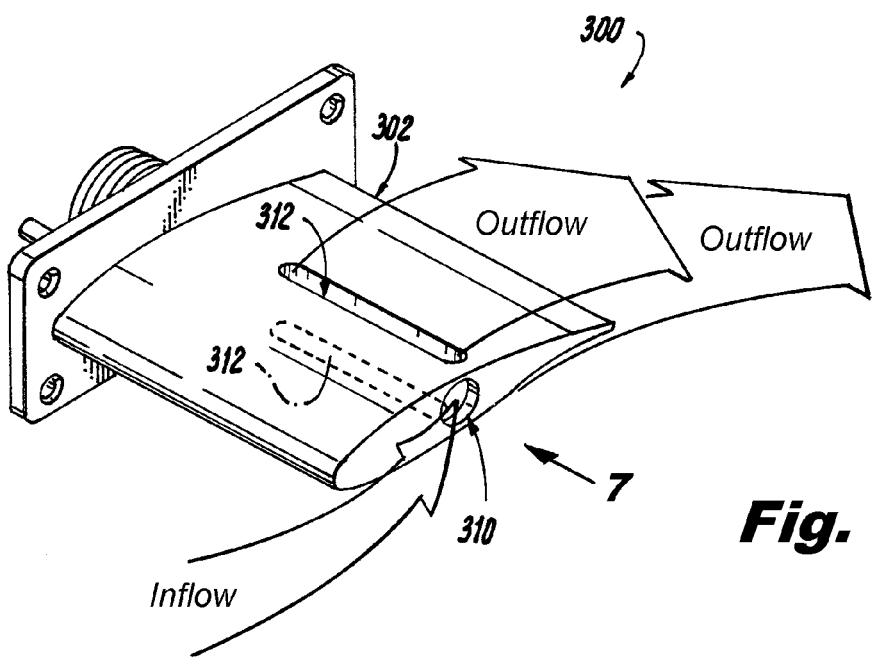
FIG. 6 is a perspective view of another exemplary embodiment of a total air temperature sensor constructed in accordance with the present disclosure, schematically showing flow entering the interior flow passage through an axially defined inlet in the airfoil tip, and exiting through a pair of elongate apertures.
Figure 7:
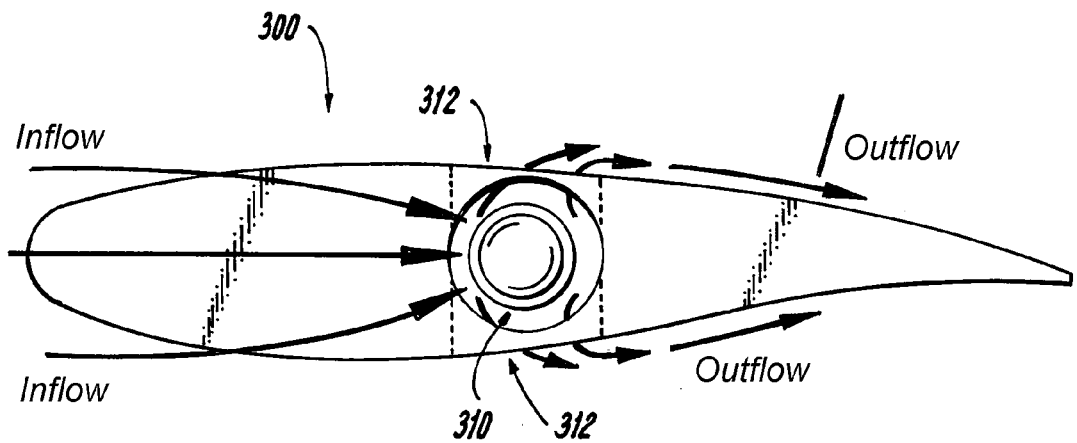
FIG. 7 is a cross-sectional end elevation view of the sensor of FIG. 6, schematically showing flow into and out of the interior flow passage for total air temperature measurements.
Figure 8:
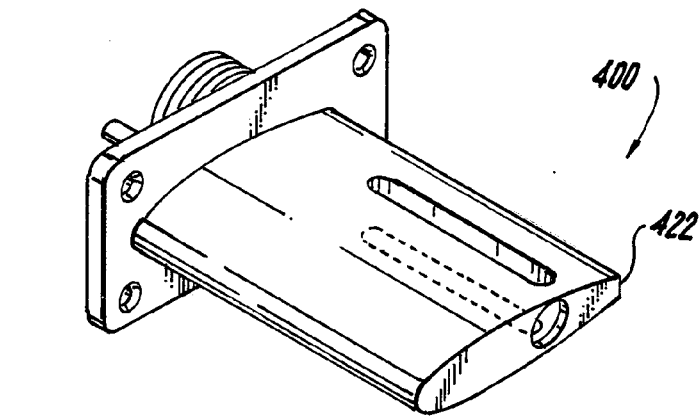
FIG. 8 is a perspective view of another exemplary embodiment of a total air temperature sensor constructed in accordance with the present disclosure, showing a truncated supercritical airfoil with an axially defined opening in the tip thereof.

Referring now to FIG. 6, another exemplary embodiment is shown, namely total air temperature sensor 300. Sensor 300 is similar to sensor 100 described above, however, the inlet 310 of the interior flow passage in sensor 300 is defined axially in the airfoil tip of airfoil body 302. The outlet of the interior flow passage in sensor 300 is a pair of elongate apertures 312 each extending axially along a respective one of two opposing exterior longitudinal surfaces of the airfoil body 302. The large arrows in FIG. 6 schematically indicate the flow into and out of the interior flow passage. As indicated schematically by the flow arrows and shock line in FIG. 7, inlet 310 and outlet apertures 312 are all located upstream of the characteristic normal shock location of the supercritical airfoil, to provide the time response and recovery error even at high Mach numbers described above with respect to sensor 100. FIG. 8 shows another exemplary embodiment of a supercritical total air temperature sensor 400 that is similar to sensor 300, including the inlet and outlet configuration, but has a truncated trailing edge 422 like sensor 200 described above. The normal shock location is not shown for sensor 400, but see, e.g., the normal shock location shown in FIG. 5. The configuration of sensor 400 provides improved time response and recovery error at high Mach numbers relative to traditional sensors, as described above with respect to sensors 100, 200, and 300.

While sensors 100, 200, 300 and 400 are shown and described without a deicing device, those skilled in the art will readily appreciate that, a deicing device, such as an electrical heater or mechanical (e.g. pneumatic) device, could be added on or near the leading edges to prevent ice buildup.

In addition to providing improved time response and recovery error at high Mach numbers relative to traditional sensors, the systems and methods disclosed herein can allow for improved performance during icing conditions, are low drag, cause minimal wake disturbance, produce less aerodynamic induced noise, and provide a simple low cost design relative to traditional sensors. Those skilled in the art will readily appreciate that with proper airfoil selection, improved total air temperature sensor performance, including improved time response and recovery error can be obtained for angles of attack up to ±10°. Those skilled in the art will also readily appreciate that the angle of incidence of the airfoil can be adjusted as needed to obtain the desired performance.

While shown and described in the exemplary context of air flow, those skilled in the art will readily appreciate that total air temperature measurements are exemplary only. Similar measurements can be made for any other suitable fluid using the techniques described herein without departing from the scope of this disclosure.

The methods and systems of the present disclosure, as described above and shown in the drawings, provide for total air temperature sensors with superior properties including improved time response at high Mach numbers relative to traditional sensors. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A total air temperature sensor comprising:
   a supercritical airfoil body extending from an airfoil base to an opposed airfoil tip along a longitudinal axis, wherein the supercritical airfoil body defines an interior flow passage with an inlet for fluid communication of fluid into the interior flow passage and an outlet for exhausting fluid out from the interior flow passage; and
   a temperature probe mounted within the interior flow passage for measuring temperature of flow through the interior flow passage to determine total air temperature.

2. A total air temperature sensor as recited in claim 1, wherein the supercritical airfoil body defines a supercritical airfoil with a characteristic normal shock location downstream of the inlet and outlet of the interior flow passage.

3. A total air temperature sensor as recited in claim 2, wherein the supercritical airfoil extends from a leading edge to a trailing edge that extends downstream of the characteristic normal shock location.

4. A total air temperature sensor as recited in claim 2, wherein the supercritical airfoil extends from a leading edge to a truncated trailing edge that terminates upstream of the characteristic normal shock location.

5. A total air temperature sensor as recited in claim 1, wherein the supercritical airfoil body defines a high pressure surface and an opposed low pressure surface each extending longitudinally from the airfoil base to the airfoil tip, wherein each of the high and low pressure surfaces extends downstream from a leading edge to a trailing edge of the supercritical airfoil body, and wherein the inlet of the interior flow passage is defined in the high pressure surface.

6. A total air temperature sensor as recited in claim 5, wherein the outlet of the interior flow passage is defined in the low pressure surface.

7. A total air temperature sensor as recited in claim 1, wherein the inlet of the interior flow passage is defined axially in the airfoil tip.

8. A total air temperature sensor as recited in claim 7, wherein the supercritical airfoil body defines a high pressure surface and an opposed low pressure surface each extending longitudinally from the airfoil base to the airfoil tip, wherein each of the high and low pressure surfaces extends downstream from a leading edge to a trailing edge of the supercritical airfoil body, and wherein the outlet of the interior flow passage is defined in one or more of the high and low pressure surfaces.

9. A total air temperature sensor as recited in claim 1, wherein the inlet of the interior flow passage defines an elongate aperture extending axially along an exterior longitudinal surface of the supercritical airfoil body.

10. A total air temperature sensor as recited in claim 1, wherein the outlet of the interior flow passage defines an elongate aperture extending axially along an exterior longitudinal surface of the supercritical airfoil body.

11. A total air temperature sensor as recited in claim 1, wherein the outlet of the interior flow passage defines a pair of elongate apertures each extending axially along a respective one of two opposing exterior longitudinal surfaces of the supercritical airfoil body.

12. A total air temperature sensor comprising:
    a supercritical airfoil body extending from an airfoil base to an opposed airfoil tip along a longitudinal axis, wherein the supercritical airfoil body defines an interior flow passage with an inlet for fluid communication of fluid into the interior flow passage and an outlet for exhausting fluid out from the interior flow passage; and
    a temperature probe mounted within the interior flow passage for measuring temperature of flow through the interior flow passage to determine total air temperature, wherein the inlet of the interior flow passage is defined axially in the airfoil tip, and wherein the outlet of the interior flow passage defines a pair of elongate apertures each extending axially along a respective one of two opposing exterior longitudinal surfaces of the supercritical airfoil body.

13. A total air temperature sensor as recited in claim 12, wherein the supercritical airfoil body defines a supercritical airfoil with a characteristic normal shock location downstream of the inlet and outlet of the interior flow passage.

14. A total air temperature sensor as recited in claim 13, wherein the supercritical airfoil extends from a leading edge to a trailing edge that extends downstream of the characteristic normal shock location.

15. A total air temperature sensor as recited in claim 13, wherein the supercritical airfoil extends from a leading edge to a truncated trailing edge that terminates upstream of the characteristic normal shock location.

* * * * *